(12) United States Patent
Abbott et al.

(10) Patent No.: US 6,601,158 B1
(45) Date of Patent: Jul. 29, 2003

(54) COUNT/ADDRESS GENERATION CIRCUITRY

(75) Inventors: Curtis Abbott, Menlo Park, CA (US); Homayoun Shahri, Santa Clara, CA (US)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/475,647

(22) Filed: Dec. 30, 1999

(51) Int. Cl.$^7$ ............................................. G06F 12/00
(52) U.S. Cl. ...................... 711/220; 711/219; 711/221; 365/236
(58) Field of Search ................... 711/200–220, 221; 365/236

(56) References Cited

U.S. PATENT DOCUMENTS 5,155,823 A * 10/1992 Tsue .......................... 711/217

OTHER PUBLICATIONS

TMS320C54x DSP Reference Set, vol. 1: CPU and Peripherals, Literature No.: SPRU131F, Apr. 1999 (consisting of: Contents xvii–xxiv; Chapter 5 Data Addressing 5–1 to 5–29).

* cited by examiner

Primary Examiner—Do Hyun Yoo
Assistant Examiner—Nasser Moazzami
(74) Attorney, Agent, or Firm—Blakely, Sokoloff, Taylor & Zafman LLP

(57) ABSTRACT

According to one embodiment of the invention, an apparatus that includes a first and second counter both including a count computation circuit and an upper bound circuit. The output of the upper bound circuit of the first counter is coupled to the count computation circuit and upper bound circuit of the second counter. The apparatus also includes a lookup table addressed by the current count value of the first counter, as well as a combining circuit coupled to the output of the lookup table and to receive the current count value of the second counter.

30 Claims, 3 Drawing Sheets

| Litval | 12 |
| RFA1Enable | 2 |
| RFA1Mux | 4 |
| RFA2Enable | 2 |
| RFA2Mux | 4 |
| RFB1Enable | 2 |
| RFB1Mux | 4 |
| RFB2Enable | 2 |
| RFB2Mux | 4 |
| Control Indirect | 9 |
| IncrCounter | 7 |
| Other fields... | |

| LoadCounterDests | 7 |
| LoadCounter | 3 |
| RFxxWDataMux | 4*4 |
| Other fields... | |

US 6,601,158 B1

COUNT/ADDRESS GENERATION CIRCUITRY

CROSS-REFERENCE TO RELATED APPLICATIONS

Not Applicable.

BACKGROUND OF THE INVENTION

1. Field of the Invention

The invention relates to the field of electronics. More specifically, the invention relates to the use of counters and address generators.

2. Background Information

The format of the instructions provided to a given processor model (e.g., central processing unit, digital signal processor, etc.) specify, among other things, the ways in which users indicate on what data the processor is to operate. One such way is for the instruction format to include one or more fields whose contents designate internal processor register(s) storing the desired data. Another such way is referred as addressing modes. Examples of addressing modes include immediate addressing, absolute addressing, direct addressing, indirect addressing, etc. In immediate addressing, the instruction format includes a field that contains the actual data to be operated on by the CPU. In absolute addressing, the instruction format includes an encoded field that identifies the address of the data. In direct addressing, the instruction format includes a field whose contents (an offset) are added to a predefined base address to acquire the address. In indirect addressing, the instruction format includes a field whose contents designate an internal processor register whose contents are to be used as the address. In at least one DSP, the instruction format for indirect addressing also provides for a field used to indicate that the address and/or the contents of the designated register should be modified by one (up or down), an offset, or an index. See Texas Instruments, Inc. book *TMS320C54X DSP Reference Set, Volume* 1: *CPU and Peripherals,* Literature Number SPRU131F (April 1999).

All of the above addressing modes, except the immediate and absolute addressing modes, require the use of additional instruction cycles to generate the addresses. Although the immediate and absolute addressing modes do not require additional instruction cycles to generate an address, they do require the use of a significantly larger number of instruction bits than the other addressing modes. These additional bits limit the number of operands that can be specified by a given instruction and/or require very large instructions. The feeding of a processor very large instructions reduces the number of instructions that can be provided to the processor in any given period of time, as thus slows processor throughput. In addition, the indirect addressing of the TMS320C54X DSP is mainly used when there is a need to step through sequential locations in memory in fixed size steps. This is true because this mode does not provide the capability to generate arbitrary sequences of addresses (non-fixed sized steps). However, there are application which require this flexibility.

BRIEF SUMMARY OF THE INVENTION

According to one embodiment of the invention, an apparatus is described that includes a first and second counter both including a count computation circuit and an upper bound circuit. The output of the upper bound circuit of the first counter is coupled to the count computation circuit and upper bound circuit of the second counter. The apparatus also includes a lookup table addressed by the current count value of the first counter, as well as a combining circuit coupled to the output of the lookup table and to receive the current count value of the second counter.

BRIEF DESCRIPTION OF THE DRAWINGS

The invention may best be understood by referring to the following description and accompanying drawings which are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention. A machine-readable medium is defined herein to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Count/Address Generator

Figure 1:
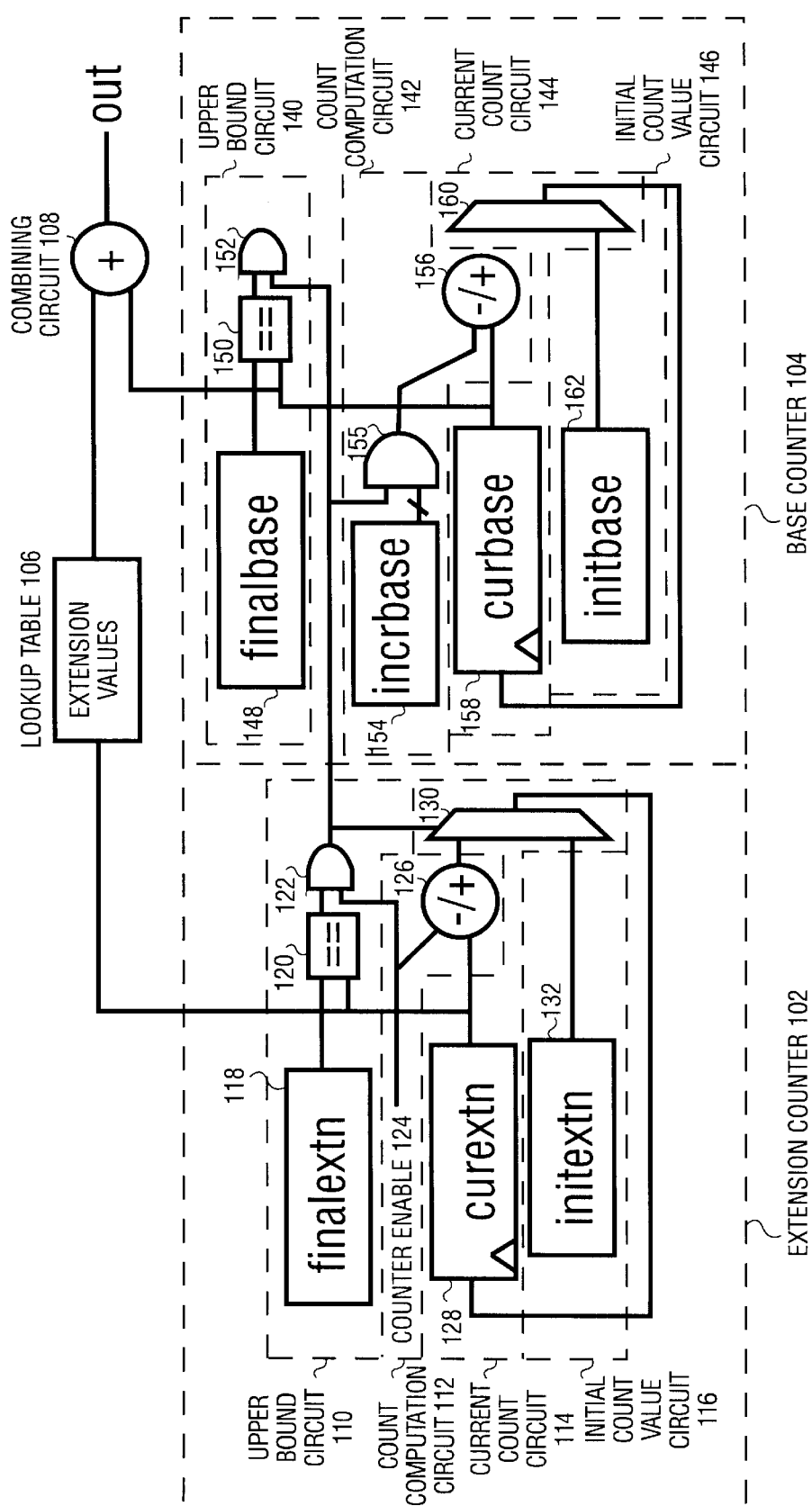
FIG. 1 illustrates exemplary count/address generation circuitry according to one embodiment of the invention.

FIG. 1 illustrates exemplary count/address generation circuitry according to one embodiment of the invention. The circuitry described with reference to FIG. 1 is designed to support complex but predefined and/or predictable address sequences (e.g., those commonly found in DSP algorithms) without using the computing cycles (instruction bits) of the main datapath elements. The addresses generated by the circuitry of FIG. 1 can be used to address any type of storage area, including registers and/or various types of internal and external memory (e.g., DRAM, SRAM, magnetic disk storage media; optical storage media; flash memory devices, etc.). In addition, the circuitry of FIG. 1 can also be used to simply maintain a count value to determine the number times a given operation is to be repeated.

FIG. 1 shows two counters (an extension counter 102 and a base counter 104), a lookup table 106, and a combining circuit 108. The extension and base counters (102, 104) both respectively include an upper bound circuit (110, 140), a count computation circuit (112, 142), a current count circuit (114, 144), and an initial count value circuit (116, 146). As defined herein: a current count circuit includes circuitry to store the current count value; an initial count value circuit provides the starting count value for the counter; an upper bound circuit includes logic to identify when the current count value has reached the upper bound; and a count computation circuit provides the increased and/or decreased count value to which the current count value is to be modified while the counter is operating and the upper bound has not been reached. The initial count value circuit can be implemented to provide the same initial count value each time, a selectable initial count value (e.g., several hardwired values could be provided from which a multiplexer or "mux" selects one), or a variable initial count value. Similarly, the count computation circuit can be implemented to provide a fixed, selectable, or variable increment and/or decrement value. While FIG. 1 shows specific implementations of the upper bound circuit, count computation circuit, current count circuit, and initial count value circuits of two different counters, it should be noted that alternative embodiments can implement these circuits in different ways.

As will be described in more detail later herein, the base counter 104 and extension counter 102 are connected sequentially (that is, the base counter 104 increments when the extension counter 102 rolls over). The current count values of the base counter 104 and the extension counter 102 are respectively referred to as the curbase and curextn. The lookup table 106 is coupled to be addressed, at least in part, based on the curextn. Where the curextn is N bits wide, in one embodiment the lookup table 106 includes $2^N$ entries (e.g., N=7 in one embodiment of the invention). While in one embodiment the lookup table is dynamic memory (e.g., DRAM, SRAM, etc.), alternative embodiment could implement part or all of the lookup table using read only memory. The output of the lookup table and the curbase are combined by the combining circuit 108 to produce the output of the circuit in FIG. 1. As previously stated, the output of the circuit in FIG. 1 can be used as a counter to determine the number of times an operation should be performed and/or an address. In one embodiment of the invention, the curbase and each entry in the lookup table 106 includes 11 bits. While in one embodiment, the combining circuit 108 operates to perform addition, in alternative embodiments of the invention the combining circuit 108 can instead and/or additionally combine its inputs in any number of ways (e.g., concatenate, a logic operation (such as XOR), etc.).

The arrangement of the circuit in FIG. 1 allows for the generation of addressing patterns in which arbitrary or random parts are stored in the lookup table 106 and addressed sequentially by the extension counter 102, and offset from the base address provided by the base counter 104.

With reference to the exemplary extension counter 102 and the base counter 104 embodiment of FIG. 1: the upper bound circuits 110 and 140 respectively include limit registers 118 and 148 (whose contents are respectively referred to as finalextn and finalbase) to allow for variable upper bounds; the initial count value circuits 116 and 146 respectively include initial count value registers 132 and 162 whose contents are respectively referred to as initextn and initbase; the current count circuits 114 and 144 respectively include current count registers 128 and 158 (whose contents are respectively referred to as curextn and curbase) to store the current count value, as well as logic (130, 160) to select the manner in which the current count value will be updated. The logic 130 and 160 is respectively controlled by the output of the upper bound circuits 110 and 140.

The count computation circuit 112 of the extension counter 102 is implemented to increment and/or decrement the curextn by a fixed value. In contrast, the count computation circuit 142 of the base counter 104 includes a count computation register 154 (whose contents are referred to as incrbase) to allow for incrementing and/or decrementing curbase by a variable amount. While one embodiment is described in which the count computation circuits can increment or decrement, alternative embodiments may allow for only increasing or decreasing the count value of one or both counters. For example, in one embodiment, element 126 performs adds by one and element 156 performs adds between curbase and incrbase (where incrbase can be a negative or positive number).

Once the initial count values and upper bound values of the base and extension counters are set, the circuit of FIG. 1 operates responsive to a count enable signal 124. The count enable signal 124 causes the count computation circuit 112 of the extension counter 102 to generate an updated count value. In addition, the count enable signal 124 is provided to the upper bound circuit 110 to allow the upper bound circuit 110 to generate a roll-over signal which is provided to: (1) the logic 130 to update curetxn (with the updated count value from the count computation circuit) or to wrap-around curextn to initextn when the upper bound is reached; (2) the count computation circuit 142 to generate an updated count value for curbase; and (3) the upper bound circuit 140 to allow that circuit to generate a roll-over signal that is provided to the logic 160. It should be noted that in the illustrated embodiment, if incrbase does not divide finalbase-initbase, then the equality comparison will fail the first time the Counter "wraps around"; then the Counter may free-run or reset to initbase only after several cycles, depending on the values of finalbase and incrbase. Thus, in alternative embodiments a greater-than and/or less-than comparison is performed in addition to or instead of an equality comparison.

While in one embodiment the combining circuit 108 performs an add operation on the full address width, the incrbase has only 7 bits and is interpreted as a signed 2s complement number between −64 and +63. Of course alternative embodiments could perform this in any number of well-known ways.

Letting E be the contents of the lookup table, $X_i$ be the initial extension value (initextn), $X_f$ be the final extension value (finalextn), $B_+$ be the base increment value (incrbase), $B_i$ be the initial base value (initbase), and Bf be the final base value (finalbase), the normal sequence is $\{E[X_i]+B_i, \ldots, E[X_f]+B_i, E[X_i]+B_i+B_+, \ldots, E[X_i]+B_f, \ldots, E[X_f]+B_f\}$. The E [ ] values allow a fixed length sequence of "random" elements to be repeated at a linear sequence of offsets (thereby forming a predictable pattern of addresses that need not be sequential and/or a fixed distance apart), where $X_i=X_f$, $E[X_i]$ defines an offset for a linear sequence. For example, to generate the sequence $\{32, 33, \ldots, 39\}$ one could set $B_i=0$, $B_+=1$, $B_f=7$, $X_i=X_f=c_1$ (an arbitrary constant), and $E[c_1]=32$. Alternatively, one could set $B_i$ to some other value and $E[c_1]32-B_i$. Generating decreasing sequences is equally straightforward. For example, to generate $\{39, 38, \ldots, 32\}$ set $B_+=-1$, $B_f=-7$, $X_i=X_f=c_2$ (an arbitrary constant), and $E[c_2]=39$. As can be observed from the example, initbase is not strictly needed to generate any sequence that can be generated by this hardware, since its value can be absorbed into the lookup table.

The circuit of FIG. 1 can be used to provide a simple count value, sequential addresses a fixed distance apart, and/or a predictable address sequence that is non-sequential and/or whose addresses are not all fixed-distances apart. Thus, whereas prior devices would use immediate fields to generate predictable address patterns where the addresses are not fixed distances apart, the circuit of FIG. 1 can be used to generate these predictable address patterns and do not require the extra instruction cycles. In addition, in an embodiment where the initial count value circuit 116 allows for selectable and/or dynamic initial count values, different address sequences can be stored in the lookup table 106 assuming there is room. As a result, the circuit of FIG. 1 can act as a multiple multi-sequence address generator. Examples of address sequences that could be stored in the lookup table 106 include: (1) a bit reversed address sequence (e.g., that used for fast fourier transform); (2) sequences of (random) address offsets of temporary variables used within a looping computation; (3) sequences of offsets representing transposed access into a matrix of addressable values where the column width is fixed as the offset sequence within the lookup table and the curextn incrementation steps along columns; etc.

One or more of the circuits described with reference to FIG. 1 can be used in any number of different devices, including a field programmable device, a CPU, a DSP, etc. While one or more of the circuits described with reference to FIG. 1 can be used in any number of devices, one or more such circuits is particularly useful in the device described with reference to FIGS. 2 and 3. It should be noted that while in certain embodiment count/address generators are provided that each have their own lookup table, alternative embodiments can be implemented in which one or more count/address generators share a lookup table.

Exemplary Programmable Core

Figure 2:
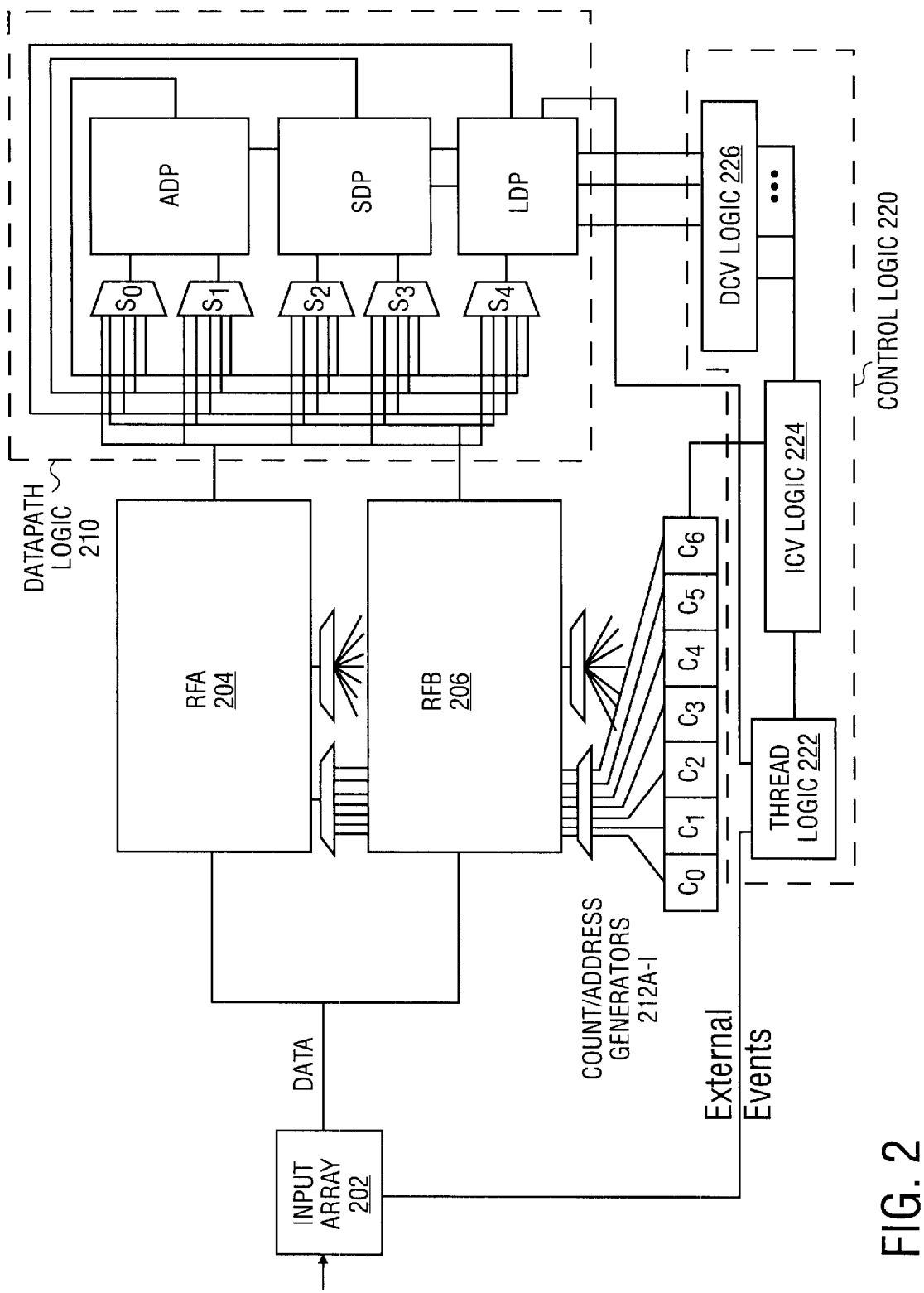
FIG. 2 illustrates an exemplary programmable core that includes count/address generation circuitry according to one embodiment of the invention.

FIG. 2 illustrates an exemplary programmable core that includes count/address generation circuitry of FIG. 1 according to one embodiment of the invention. This particular exemplary embodiment is intended to perform all types of inner-loop functions more efficiently than other types of programmable technology (e.g., DSP chips or cores, field programmable gate arrays, etc.). Thus, at least certain implementations of this embodiment are not intended to replace a CPU at the system level, but will be controlled by a traditionally CPU as is normally done in systems that use field programmable gate arrays, ASICs, or other types of circuitry. The one or more CPUs, which may be quite powerful or as simple as 8 bit micro controllers, are typically intended to be more efficient in their use of instruction bits for outer loop control functions, thereby optimizing use of memory throughout the system and/or keeping every element programmable. Thus, the programmable device of FIG. 2 is intended to replace DSP cores and chips, FPGAs, ASIC blocks, and other similar circuitry that perform computational tasks (e.g., forward error correction algorithms, cryptographic scrambling, etc.).

Certain embodiments of the circuitry in FIG. 2 are intended to handle tasks of medium algorithmic complexity in a standalone manner, without tight coupling to the controlling CPU(s). The term algorithmic complexity is used hereto to refer to the number of basic blocks, loops, and conditional statements needed to specify an algorithm. For example, inner-loops typically have primitive combinational elements that are relatively complex (such as large multiplications, complex Linear Feedback Shift Registers, other bit-oriented functions, etc.), but their algorithmic complexity is generally moderate. The DES encryption algorithm, which repeats a complex bit-oriented step 16 times to scramble 64 bits of data, is an example of a low algorithmic complexity but high combinational complexity algorithm.

With reference to FIG. 2, an input array 202, a set of register files (RFA 204 and RFB 206 ), control logic 220, a set of count/address generators 212 A–I, and datapath logic 210 are shown. Thus, the circuit of FIG. 2 consists generally of three types of resources: Data memory (the register files), Control (the control logic 220 and the dual counter address generators), and Processing (the datapath logic 210).

In embodiment of FIG. 2, the instruction memory resources are entirely within the device. In particular, as described later herein the control logic 220 provides for the instruction memory. As such, during execution of a program the input array is utilized for receiving data (certain embodiments allow for event/control signals to also be received at the input array). While in this embodiment, the instruction memory resources are entirely within the device (there is no provision for on-demand loading of parts of a larger program, for example, by cache), alternative embodiments could provide for on-demand loading of instructions. In addition, certain embodiments provide for the input of control signals other than external events that can be provided to various other circuits in the device.

The control logic 220 provides for a computer-like control, including conditional branches, zero overhead looping (e.g., up to N loops deep), etc. The control resources also register files.

Datapath Logic

In one embodiment, the processing resources consist of three units: the "Logic Datapath" or LDP is devoted to accelerating arbitrary logic computations by dynamic implementation of Boolean logic equations; the "Arithmetic Datapath" or ADP is designed for DSP arithmetic; finally, the "Simple Datapath" or SDP is aimed mainly at more traditional ALU-style computations. In one embodiment, the datapaths include one or more of the datapaths described in the following: U.S. Pat. No. 5,974,435; U.S. patent application titled "Programmable Logic Datapath That May Be Used In A Field Programmable Device", application Ser. No. 08/874,817, filed Jun. 13, 1997; U.S. patent application titled "Programmable Logic Datapath", application Ser. No. 09/346,556, filed Jun. 30, 1999; and U.S. patent application titled "Sums Of Products Datapath", application Ser. No. 09/399,981, filed Sep. 20, 1999.

Control Logic

The control logic 220 provides control signals to the register file(s) and the datapath logic 210. While various implementations of the control logic 220 are possible, the control logic 220 of the exemplary embodiment of FIG. 2 includes thread logic 222, indirect control vector (ICV) logic 224, and direct control vector (DCV) logic 226.

An ICV is a first level instruction (like a vertical microinstruction in the ancient parlance of the 1960's and 1970's); a DCV is developed by reading many memories of various sizes at addresses found in the ICV. The DCV directly controls the datapath in a very low level way, and hence, is like a horizontal microinstruction (speaking again in a somewhat dated language). While any number of ICVs may be stored in the ICV logic 224, in one embodiment of the invention the ICV logic 224 stores 4096 ICVs, each consisting of several sub-fields of differing lengths. Some of these sub-fields are used directly to control parts of the circuitry, and are therefore called "direct ICV sub-fields". Other of these sub-fields are further decoded by the DCV logic 226, to select other parts of a direct control vector (DCV) to program/configure various portions of the circuitry. These sub-fields are called "indirect ICV sub-fields".

In one embodiment, the DCVs are selected from as many memories as there are indirect ICV sub-fields. Each memory is of an appropriate width to control those parts of the circuitry to which it is dedicated, and has a depth, or number of elements, equal to $2^x$ where X is the length of the indirect ICV sub-field that addresses that memory. These DCV memories may be of any type, including one or more of DRAM, SRAM, ROM, etc. While one embodiment is described which uses subfields and separate memories, alternative embodiments could use most or all of the ICV to address a single memory.

The thread logic 222 operates to select the indirect control vectors for multiple conceptually distinct "threads" of control, using parallel hardware to perform the "thread switching" on a cycle-by-cycle basis. Distinct portions of the register file(s) may be used by different threads to avoid thread switching overhead. In an alternative embodiment, the thread logic 222 and the ICV logic 224 are not present and the DCV logic 226 is operatively coupled to receive the indirect control vectors from the input array 202 (e.g., an opcode contained in an instruction provided by a coupled microprocessor). In yet another alternative embodiment, rather than decoding, a serially programmable 1-deep memory is included to provide the control signals.

In one embodiment, the ICVs have more than 50 fields that define different aspects of the machine's behavior on each clock cycle. Some of the fields correspond to fields found in more traditional microprogrammed computers, such as those having to do with register file addressing outside of the count/address counters, branching, and the like. Other fields have a quite different flavor, which is dynamic definition of hardware functionality at the level of Boolean functions.

Figure 3:
FIG. 3 illustrates exemplary instruction and microinstruction memories of the exemplary programmable core of FIG. 2 according to one embodiment of the invention.

As previously discussed, the ICVs and DCVs are similar to instructions and microinstructions, respectively. FIG. 3 illustrates exemplary instruction and microinstruction memories of the exemplary programmable core of FIG. 2 according to one embodiment of the invention. In this Figure, the ICV is on the left; arrows from some of its fields to other blocks correspond to addresses in the ICV being used to look up values in the corresponding memories.

Thus, each block in this diagram represents one logical memory, whose width is the sum of the widths of its fields. The depths are not shown here, although in the case of the indirect memories (i.e., all except the leftmost), the depth is 2 raised to the power of the width of the corresponding field in the ICV. For example, the ICV's "ADP Indirect" field is 9 bits wide, indicating that the corresponding memory is 512 entries deep.

In one embodiment, the ICV memory width is 96 and depth is 4096 (thus, there can be 4096 instructions), while the DCV width is the sum of the widths of all the other memories that participate in defining the logic on each cycle. However, memory depths can be changed in different implementations, including the depth of the register files. Deeper memories tend to allow for the processing of more complex inner loops, a larger number of distinct inner loops (timeshared), bigger data buffer, etc.

Register File(s)

In one embodiment, the register files 204 and 206 are both dual-ported, 32 bits wide, and 2048 elements deep. In a traditional CPU, registers are addressed directly, by placing their index in an instruction field; one of the important functions of registers is to contain addresses of external memory locations, which are loaded or stored by various flavors of indirect addressing modes. In one embodiment, the Litval field may optionally be used to address a register, but the register files are normally addressed by the count/address generators 212 A–I, which allow them to be indirectly addressed and used in various ways, such as arrays, scalar variables, and pointers. Because there are so many registers, the register files take over many of the functions of external memory (e.g. first level cache) in more traditional CPUs. This high bandwidth, low latency access to a moderately large amount of memory increases overall performance. As previously stated, more or less register files with different numbers of ports, of different widths, and/or different depths can be used. In addition, additional and/or different data memory could be provided (e.g., cache, main memory, etc.)

In addition, in one embodiment each register file port is independent; reads and writes from/to each port are independent. Both ports are addressed in the same way, with 2 fields of the ICVs (making a total of 8 fields); Table 1 illustrates the two fields.

TABLE 1

| RFX#Mux | selects an address generator, the Literal field, or datapath outputs |
|---|---|
| RFX#Enable | 0: unused, 1: read, 2: write, 3: write from store buffer |

Here x stands for the register file, RFA or RFB, and # stands for the port number, 1 or 2. Thus, there are 2 conteol for each of the 4 ports: the MUX field selects the address for the port while the Enable field selects its activity: read, write, or none. Expanded out, the 4 address selection fields are RFA1Mux, RFB1Mux, RFA2Mux, and RFB2Mux; the four activity encoding fields are RFA1Enable, RFA2Enable, and RFB2Enable.

The address selection ("Mux") fields have mainly to do with the address generators. In one embodiment, there are 7 count/address generators, all of which are accessible to every port. In addition, the contents of the Litval field can always be used as an address. Also, port 1 address MUX sources are a superset of port 2 address mux sources: port 1 may be addressed directly from datapath outpaths, namely the low 11 output bits of SDP, LDP, or ADP. This permits direct addressing of these ports from computed addresses, i.e., array indexing where the index is an arbitrary expression.

the binary encoding for the MUX fields is shown in Table 2.

TABLE 2

| 0 | Counter0 |
|---|---|
| 1 | Counter1 |
| 2 | Counter2 |
| 3 | Counter3 |
| 4 | Counter4 |
| 5 | Counter5 |
| 6 | Counter6 |
| 7 | Litval0 |
| 8 | Ldpout (port 1 only) |
| 9 | Sdpout (port 1 only) |
| 10 | Adpout (port 1 only) |

Write data may come directly from a register file read port, the output of a datapath unit, or from a single-entry store buffer (in certain embodiments, there is a single-entry store buffer for each register file write port, these are latched under program control).

Table 3 shows one of the RFXWDataMux# control fields.

TABLE 3

| . | . | . |
|---|---|---|
| . | . | . |
| . | . | . |
| 6 | CounterStore | 32 bits of Counter Storeback Register |
| . | . | . |
| . | . | . |
| . | . | . |

Of course, other RFXWDataMux# control fields are implemented to control various parts of the system, including the datapaths and/or register files. The per-port store buffers have an additional use as temporary "in datapath" variables. Specifically, whenever the RFX#Enable field is not set to the "Read" opcode (binary value 1), the output wires from the corresponding port are set to the current value of that port's store buffer. Thus, to use a store buffer as a temporary variable, set it in the usual way and then select the appropriate register file source (in any of the source mux control fields) while not reading on the corresponding register file port. Note that it is possible to write to the register file port while holding and using the value of the store buffer.

Count/Address Generators

Each of the count/address generators 212A–I is made up of circuitry that is the same as or similar to that described with reference to FIG. 1. The state of each count/address generator can be loaded from the datapath, so that data-dependent addressing patterns can be generated, and count/address generators can be re-initialized under program control when entering new loops, etc.

The n count/address generators are numbered 0 through n-1 (in one embodiment, n=7). Different count/address generators can be applied to a given register file port on different cycles. Generally speaking, a count/address generator will be associated with part of a computational process or algorithm but not necessarily with a specific register file port. In one embodiment, the IncrCounter field of FIG. 3 is used to control when a given counter's curextn is to be incremented. Particularly, one bit of the IncrCounter field is assigned to each counter, wherein a value of one causes incrementing by 1 and a value of zero causes no change. Alternative embodiments can use any number of other techniques for controlling the incrementing and/or decrementing of the curextns of the counters (e.g., encoding the field, allowing for decrementing, allowing for incrementing and/or decrementing by different amounts, etc.). For example, in one embodiment the control fields are designed to allow bits to be used to designate which counter(s) to modify, and in some embodiments, by how much. In such embodiments, it may or may not be possible to increment and/or decrement all counters in a given cycle.

In one embodiment, each count/address generator always generates as many bits as are needed to address the register files. Thus, the amount of bits generated by a given count/address generator is dependent on the depth of the register files (e.g., when the register files are 2048 deep, the count/address generators each generate 11 bits).

As previously stated, while in one embodiment all count/address generators are completely interchangeable for register file addressing purposes, one or more of the address counters may also be used as loop counters. Specifically, a Thread may branch on the condition that one of the count/address generators has its curbase≠finalbase. Also, one or more of the count/address generators are each associated with a specific Slave Port input or output. Depending on which of these I/O's is used in a given application, certain of the count/address generators may have to be dedicated to them during some or all of the firmware execution cycle.

As previously indicated, certain kinds of algorithms require one or more addressing sequences that are pre-defined and/or predictable. In addition to other things, the circuitry described with reference to FIG. 1 can be used to provide such address sequences. With particular reference to the circuitry described with reference to FIG. 2, the circuitry can be used to optimize inner loops that require such address sequences, with the only program-based action being to increment them as needed. With reference to FIG. 3, an instruction word's IncrCounter field enables incrementing the curextn register of a count/address generator.

In certain scenarios, the count/address generators can be configured by an external CPU before the program is run. The count/address generators are either reinitialized before each subsequent invocation or the program is arranged to bring them all back to their initial state.

However, for other algorithms, the count/address generators must be changed as the program runs. For example, it is useful to change the state of count/address generators where data-dependent addressing is required (to be able to load curbase and/or finalbase from the datapath itself). Examples of algorithms that use data-dependent addressing include: when correcting errors in block codes (such as Reed-Solomon codes) one could index the block at computed error locations, when generating upper and lower triangular matrix addressing patterns, etc. As described in more detail later herein, these situations can be handled by using an first count/address generator for an outer loop and using a second count/address generator for an inner loop, where the second count/address generators initial and/or final value is copied from the first count/address generator.

As another example, it is useful to change the state of count/address generators where there are not enough count/address generators to provide the number of address sequences required by the one or more algorithms needed to implement complete system solutions. Thus, it may also be necessary to reuse count/address generators for different address sequences in different parts of applications. This typically requires changing all of one or more count/address generators states, mot just the curbase and finalbase registers.

Thus, in one embodiment of the invention, there is a mechanism to change the contents of one or more of the count address generators under program control. The LoadCounter and LoadCounterDests fields (see FIG. 3) are used to provide for this mechanism.

Specifically, LoadCounter provides the "opcode" while LoadCounterDests is a 7-bit bitmap that selects the counter (s) to be loaded (in case the opcode is non-zero). Thus, just as any subset if tge 7 count/address generators may be incremented on the same cycle (by the IncrCounter field), so can any subset of them be loaded on a single cycle, although only with the same value. (Note, however, that in embodiments where each count/address generator has its own lookup table, count/address generators loaded with the same state may still generate different addresses.) The Loadcounter opcodes are summarized in Table 4.

TABLE 4

0 Nop
1 Store
2 RFLoad
3 unused
4 CtrToCur
5 CtrToFinal
6 SdpToCur
7 SdpToFinal

The store opcode is not a load, but a store; the mechanics of this are described later herein. The RFLoad opcode causes a 64-bit value to be assembled from the port 1 output of register files A and B, and this value to be loaded into the state register associated with the count/address generator(s) selected by the LoadCounterDests field. Table 5 gives the assignments of register file bits to count/address generator(s) state variables.

TABLE 5

| | |
|---|---|
| curbase | RFA 0–10 |
| finalbase | RFA 12–22 |
| initbase | RFA 24–31 and RFB 0–2 |
| incrbase | RFB 4–10 |
| curextn | RFB 11–17 |
| finalextn | RFB 18–24 |
| initextn | RFB 25–31 |

Normally, this is used by initializing appropriate A and B registers to the desired values, which are then loaded by the program when it changes from one section of code to another (e.g., at a subroutine calling boundary).

The last 4 opcodes for LoadCounter cause just one of the count/address generator's state registers to change—either curbase or finalbase. The source is either the least significant 11 bits of the SDP output or the curbase of the count/address generator numbered one less than this one. For example, "LoadCounter(CtrToCur), LoadCounterDests(1)" copies the curbase of count/address generator 0 to the curbase of count/address generator 1. Similarly, "LoadCounter (CtrToFinal), LoadCounterDests(5)" copies the curbase of count/address generator 4 to the finalbase of count/address generator 5.

One purpose of specialized opcodes to load curbase and finalbase is to permit "triangular" addressing patterns. These are the type of addressing patterns exemplified by the following C code:

for(i=0;i<12;i++)
        for(j=0;j 21 i;j++)
            do something

The addressing pattern for j is: 0, 0, 1, 0, 1, 2, 0, 1, 2, 3, . . . If i is going down a matrix by rows and j is going across columns, then this addressing pattern for j gets at the lower triangular part of the matrix. This pattern can be generated by using count/address generator 1 for i, count/address generator 2 for j, and doing "LoadCounter(CtrToFinal), LoadCounterDests(2)" at the beginning of every inner loop.

While one embodiment is described above in which various loading types are possible, alternative embodiments could provide more, less, and/or different loading types. For example, alternative embodiments could provide for loading of a count/address generator from others of the datapaths or none of the datapaths.

Saving Counter State

Count/address generator registers are analogous to address registers in traditional CPU architectures. To ensure maximum utility, it is useful to allow for both the loading and storing of these "registers." As alluded to above, in certain embodiments it is also possible to store the value of all state registers associated with a count/address generator in an internal count/address generator storeback register. In the embodiment described with reference to Table 4, this register is available in the write data mux control fields for storing back to either register file (namely, the Store opcode, value 1). The count/address generator to be stored is the one count/address generator whose bit is set in the LoadCounter-Dests field.

Thus, in one embodiment, saving count/address generator state is a two step process: first load the count/address generator state into the count/address generator storeback register, and then select that source in the write data mux and write the register file in the usual way. While in one embodiment at most the state of one count/address generator can be stored in the count/address generator storeback register at a time, alternative embodiments can support additional storage. In addition, while one embodiment provides for a count/address generator storeback register for each count/address generator, alternative embodiments may provide none, storeback registers for only some, and/or a bank of one or more storeback registers shared by one or more of the count/address generators.

Counter Configuration

In one embodiment, each count/address generator is configured by writing 128 11-bit registers to define the lookup table, one 32-bit register to define the extension counter registers, and two 32-bit registers to define the base counter registers. The lookup table is in a separate "address space" from the count/address generators. Each count/address generator definition takes 3 addresses, with base at offset 0, extension at offset 2. Tables 6–8B show the allocation of bits within 32-bit registers for the lookup table, base counter, and extension counter registers, respectively, according to one embodiment of the invention.

TABLE 6

| | | |
|---|---|---|
| | 11 | 0 |
| Lookup Table 0–31 | reserved | Entry [i] |

TABLE 7

Count/address generator 0–6:

| | | |
|---|---|---|
| Addr 0 | 16 | 0 |
| | Finalbase | curbase |

TABLE 8A

| | | |
|---|---|---|
| Addr 1 | 16 | 0 |
| | Incrbase | initbase |

TABLE 8B

| | | | | |
|---|---|---|---|---|
| Addr 2 | 24 | 16 | 8 | 0 |
| | reserved | Finalextn | initextn | curextn |

Of course, alternative embodiments can use different configurations. In addition, in certain alternative embodiments, fields are provided whose contents indicate whether other fields are ignored.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
    a first and second counter both including a count computation circuit and an upper bound circuit, the output of the upper bound circuit of the first counter coupled to the count computation circuit of the second counter;
    a lookup table addressed by a current count value of the first counter; and a combining circuit coupled to the output of the lookup table and to receive a current count value of the second counter.

2. The apparatus of claim 1, wherein the count computation circuit of the first counter one of increments and decrements the current count value by a fixed value.

3. The apparatus of claim 1, wherein the count computation circuit of the second counter one of increments and decrements the current count value by one of a selectable and a variable value.

4. The apparatus of claim 3, wherein the count computation circuit of the second counter includes a count computation value register to store the variable value.

5. The apparatus of claim 1, wherein the output of the upper bound circuit of the first counter is also coupled to the upper bound circuit of the second counter.

6. The apparatus of claim 1, wherein the first and second counter both include an initial count value circuit that provides one of a selectable and a variable value.

7. The apparatus of claim 1, wherein at least part of the lookup table is dynamic memory.

8. The apparatus of claim 1, further comprising logic coupled between the first counter and the lookup table to receive the current count value of the first counter, the logic also coupled to receive a different input, the logic to provide addresses to the lookup table based on the current count value of the first counter and the different input.

9. The apparatus of claim 1, wherein the combining circuit adds.

10. The apparatus of claim 1, wherein the combining circuit performs an exclusive OR operation.

11. The apparatus of claim 1, the lookup table to store separate pluralities of extension values, each separate plurality of extension values being stored such that it will be sequentially addressed by the first counter.

12. The apparatus of claim 11, wherein the first counter includes an initial count value circuit that includes an initial count value register, the contents of which select between the separate pluralities of extension values.

13. The apparatus of claim 11, wherein each of the pluralities of extension value allows the output of the combining circuit to provide an output consistent with a different multi-sequence generator.

14. The apparatus of claim 11, wherein a first of the pluralities of extension values provides for bit reversed addressing.

15. The apparatus of claim 11, wherein a first of the pluralities of extension values is a predictable sequence of nonsequential values of which at least some are not fixed distances apart.

16. An apparatus comprising:
a plurality of circuits each including,
two counters, with limit registers, connected sequentially to respectively provide an extension and base count value,
a lookup table coupled to be addressed at least in part by the extension count value, and
a combining circuit coupled to the output of the lookup table and to receive the base count value.

17. The apparatus of claim 16, further comprising a loading circuit coupled to load initial count values into at least one of the two counters of a first of the plurality of circuits with the output of a second of the plurality of circuits.

18. The apparatus of claim 16, wherein at least part of the lookup table is dynamic memory.

19. The apparatus of claim 16, wherein the combining circuit adds.

20. The apparatus of claim 16, the lookup table to store separate pluralities of extension values, each separate plurality of extension values being stored such that it will be sequentially addressed.

21. The apparatus of claim 20, wherein the counter of a given one of the plurality of circuits that provides the extension count value can be set to different initial count values to select between the separate pluralities of extension values.

22. The apparatus of claim 20, wherein each of the pluralities of extension values allows the output of the combining circuit to provide an output consistent with a different multi-sequence generator.

23. The apparatus of claim 20, wherein a first of the pluralities of extension values provides for bit reversed addressing.

24. The apparatus of claim 20, wherein a first of the pluralities of extension values is a predictable sequence of nonsequential values of which at least some are not fixed distances apart.

25. A programmable core comprising:
an input array to receive data and control signals;
a set of one or more register files coupled to said input array to receive said data;
a set of one or more datapaths coupled to said set of one or more register files to operate on said data;
a plurality of count/address generators each having a lookup table to provide predictable sequences of addresses at address ports of said set of one or more register files; and
control logic coupled to receive said control signals and coupled to control said set of one or more datapaths and said plurality of count/address generators.

26. The programmable core of claim 25, wherein said control logic is preprogrammed before execution of a program such that all instructions of the program are stored in the core.

27. The programmable core of claim 25, wherein said control logic comprising a loading circuit coupled to load initial count values into at least a first of said plurality of count/address generators with the output or other values of a second of the plurality of count/address generators.

28. The programmable core of claim 27, wherein a first and second of said plurality of count/address generators each contains two counters that respectively provide an extension and base count value, and one of said other values is the loading of the current base count value of the first count/address generator into the current base count value of the second count/address generator.

29. The programmable core of claim 25, wherein said control logic comprising a storing circuit coupled to store at least certain of the state of one of said plurality of count/address generators in one of said set of register files.

30. The programmable core of claim 25, wherein each of said plurality of count/address generators includes:
a first and second counter both including a count computation circuit and an upper bound circuit, the output of the upper bound circuit of the first counter coupled to the count computation circuit and upper bound circuit of the second counter;
a lookup table addressed by the current count value of the first counter; and
a combining circuit coupled to the output of the lookup table and to receive the current count value of the second counter.

* * * * *